United States Patent [19]

Searcy

[11] 4,220,996
[45] Sep. 2, 1980

[54] JOGGER'S COMPUTATIONAL DEVICE

[76] Inventor: Talmadge R. Searcy, 515 W. Dee St., Lebanon, Ill. 62254

[21] Appl. No.: 8,193

[22] Filed: Jan. 31, 1979

[51] Int. Cl.² .......................................... G01C 22/00
[52] U.S. Cl. .............................. 364/561; 235/92 DN; 235/105; 340/323 R; 364/410; 364/415
[58] Field of Search ............... 364/410, 415, 560, 561, 364/562, 413; 235/92 CP, 92 DN, 92 MT, 105; 340/321, 323 R; 272/100, 70; 73/490

[56] References Cited

U.S. PATENT DOCUMENTS

| 2,457,968 | 1/1949 | Allen et al. | 340/323 R |
| 3,797,010 | 3/1974 | Adler et al. | 340/323 R |
| 3,846,704 | 11/1974 | Bessette | 340/323 |
| 3,893,099 | 7/1975 | Zoepfl | 340/321 |
| 4,028,693 | 6/1977 | Kuntz | 340/323 R |
| 4,053,755 | 10/1977 | Sherrill | 364/561 |

Primary Examiner—Errol A. Krass
Attorney, Agent, or Firm—Kalish & Gilster

[57] ABSTRACT

A portable self-contained computational device for use by a striding athlete, such as a jogger, includes a stride length selector permitting the athlete to preselect a normal length of stride and a rate selector permitting the athlete to preselect a desired rate of travel by striding, as in minutes/mile. Circuitry of the device generates repetitive signals at a desired striding cue, or pacing, rate. A signalling device provides perceptible striding cues to the athlete in response to these repetitive signals. The device includes a computing circuit responsive to the rate selector to provide incremental distance measurements periodically. An accumulator accumulates the incremental distance measurements and a display provides to the athlete an indication of the accumulated total of the incremental measurements, thus indicating the total distance covered by the athlete's striding in synchronism with the striding cues. The device selectively also displays the total elapsed time of striding and makes possible also precise calibration of the athlete's normal length of stride.

20 Claims, 9 Drawing Figures

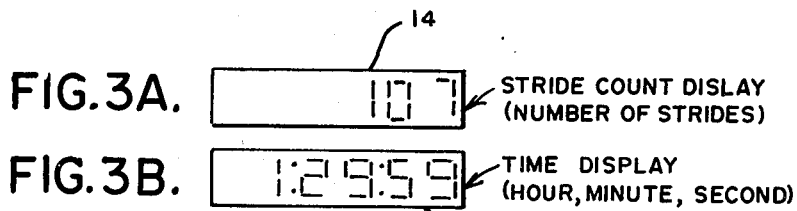
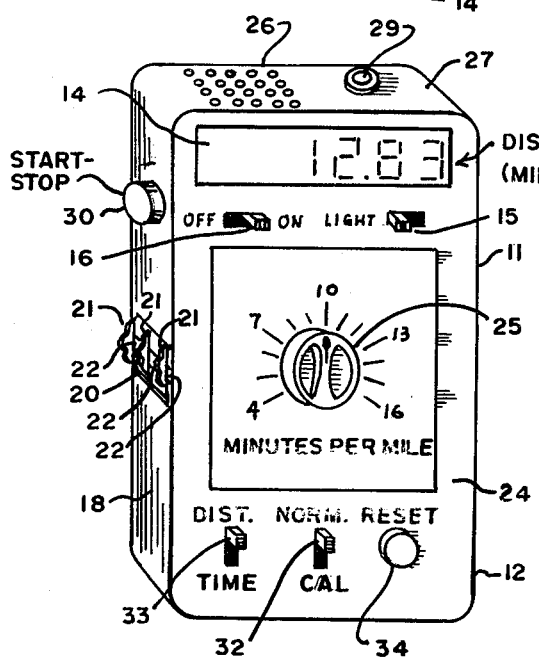
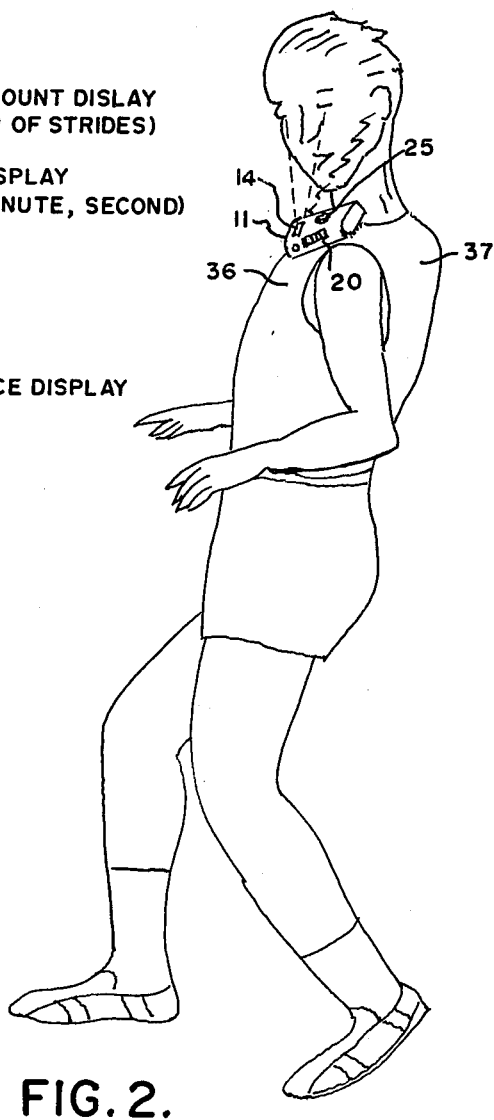
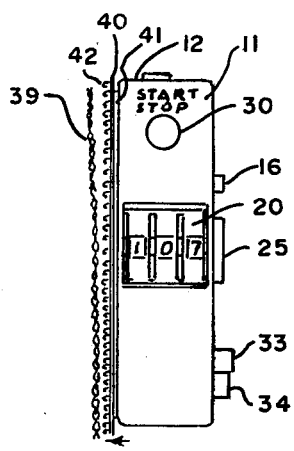

JOGGER'S COMPUTATIONAL DEVICE

SUMMARY AND BACKGROUND OF THE INVENTION

The invention relates to computational devices for use by athletes and, more particularly, to a new portable, self-contained computational device for use primarily by joggers, runners, and other striding athletes for measuring distances and other parameters precisely during striding, while also pacing the user.

Pedometers have long been well known, being predominantly of a mechanical character. However, Sherrill U.S. Pat. No. 4,053,755 teaches the construction of an electronic pedometer having a weighted balance which closes with each step taken by the user to actuate an electronic calculator circuit of the usual hand-held type. The user first must enter, by means of the conventional keyboard, the calculated fraction of an interval of measurement, such as miles, which is represented by the length of each step of the user. Each actuation of the calculator causes it to add the fractional interval.

But regardless of whether mechanical or electronic, such pedometers serve no more than to measure total distance covered during a striding endeavor, such as walking, jogging, or running. They provide no function of enabling a person to measure his pace or cadence of striding and, therefore, are of relatively little benefit to athletes interested in improving their performance, pacing their athletic endeavors, or achieving a desired level of physical fitness.

Pacing is an old expedient in athletic training. Nearly everyone is familiar, for example, with coxswain's pacing of oarsmen of a racing shell whereby their rowing efforts may be precisely maintained for maximum speed and endurance. In fact, such pacing of an athletic endeavor may well date back to the calls of a rowing master in Roman galleys for causing hapless slaves to row at a prescribed cadence. Even in modern athletics, pacing is often utilized in training for athletic events. For this purpose, coaches often use stop-watches, markers, and/or may provide signals or indications of various types of athletes for pacing, etc.

It is, therefore, not surprising to see this age old practice facilitated by an athletic timer as disclosed in Zoepfl U.S. Pat. No. 3,893,099 which discloses a miniature audio timer for use in certain athletic events and training. The timer has a conventional audio oscillator circuit and associated speaker secured in some manner to an athlete's person to provide an audible tone at controlled time intervals. This patent teaches that the length of the time interval between audible tones may be adjusted by the user in accordance with the frequency of associated distance markers which are placed at regular intervals along the course of an athletic event. A runner utilizing the Zoepfl device may adjust the intervals so that the runner covers, for example, substantially one portion of a course between markers in one of the intervals of time between successive tones. This provides a visual indication to the runner of performance with respect to a specified time standard. The timer is adjusted by a dial so that the interval between tones may vary from about 5 seconds to 65 seconds. Accordingly, the device is not intended nor utilizable for pacing strides of a striding athlete, such as a jogger or runner, which are much more frequent than every five seconds. All the more clearly, such device is not useful in cross-country running or jogging, or in any other athletic event where markers are not provided for comparison visually by the athlete with the constant rate audible tones produced by the timing mechanism.

Joggers and runners are particularly concerned with not only the pace at which they are jogging or running, i.e., the stride rate, but also with the distance and time which have elapsed in the course of their running or jogging. Conventional mechanical or electronic pedometers are not useful for providing an indication of distance traveled, since the normal length of stride varies depending on whether the athlete is jogging, walking, or running. But, assuming a given stride rate, each individual typically has a relatively precisely determinable normal length of stride. By length of stride is meant the distance measured in inches (or centimeters) between two successive steps of the same foot.

It is, therefore, an object of the present invention to provide a computational device for use by an athlete or other person striding, such as a walker, jogger, or runner, which provides not only an audible signal for each stride that such person takes but also computes and displays the total distance covered by striding.

It is a further object of the invention to provide such a device which is of a portable, self-contained character for being conveniently carried on the person of the individual, such as a jogger, runner, or other athlete.

A still further object of the invention is the provision of such a device which is amenable to being carried on the person of the user for serving as receptible striding cues to such an individual but also which is amenable to being carried in a position upon the body of the user in which it may also be readily observed for explaining to such individual the total distance covered without requiring such person to halt his striding.

Another object of the invention is the provision of such a device audibly perceptible striding cues at a precise and reproducable rate which can be preselected by the user.

A further object of the invention is the provision of such a device which permits the user to change the desired rate of striding without affecting the accuracy or correctness of indication of the total distance covered by such persons at striding activity, whether it be jogging, running, or walking.

A further object of the invention is the provision of such a device which provides an accurate indication of the total time during such person's activities.

A still further object of the invention is the provision of such a device which provides time-out/time-in features of operation permitting the user to temporarily halt striding activity, e.g., jogging, without affecting the total distance or time indicated by the device, allowing the user to start or stop the striding activity as desired without affecting the elapsed distance or time displayed by the device.

Another object of the invention is the provision of a device of the character stated which can be utilized for pacing virtually any repetitive exercise, such as bicycling, push-ups, sit-ups, stationary run, and other calisthenics, and which may also be utilized to measure distance and time elapsed, as during bicycling, etc., as well as to compute effective distance covered during the stationary run, for example.

Yet another object of the invention is the provision of such a device which allows use of a simple method of calibration to determine the average normal length of stride of an individual during a striding activity, whether the same be jogging, running, or walking.

Other objects will be in part apparent and in part pointed out hereinbelow.

DESCRIPTION OF THE DRAWINGS

FIG. 1 is a perspective view of a device constructed in accordance with and embodying the present invention.

FIG. 2 is a pictorial illustration showing one manner of securing the device to the body of a jogger utilizing it.

FIGS. 3A and 3B are two illustrations of a display of the device as utilized for displaying two different types of information.

FIG. 4 is a side elevation of the device, illustrating one manner of securement of the device to wearing apparel.

Corresponding reference characters indicate corresponding parts throughout the several view of the drawings.

DESCRIPTION OF THE PREFERRED EMBODIMENT

Figure 5:
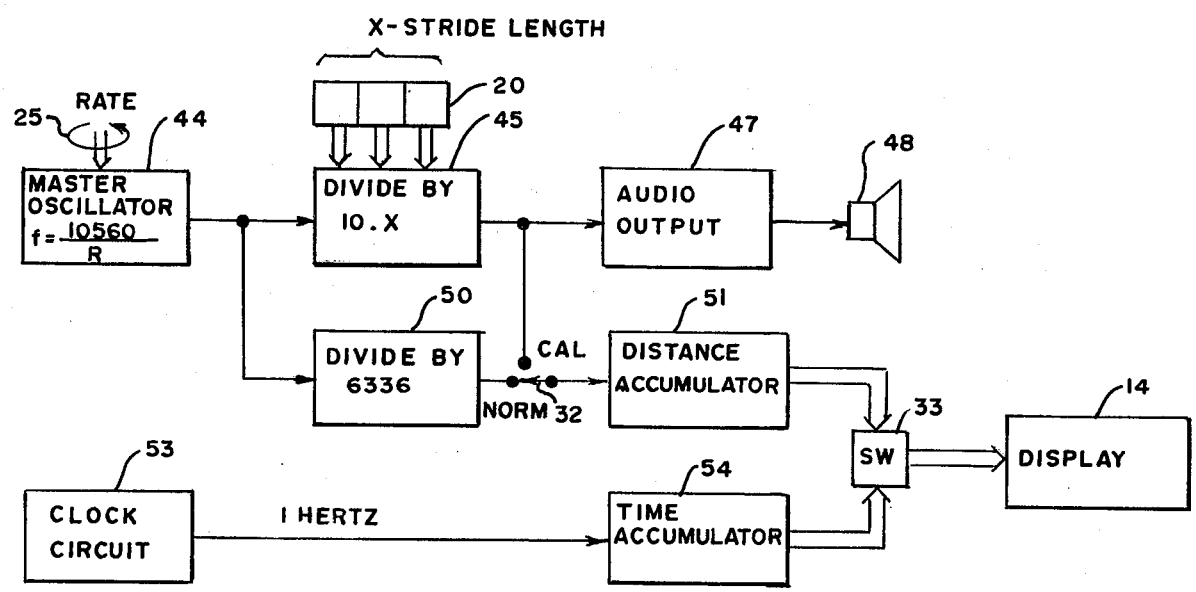
FIG. 5 is a block diagram of circuitry of the device.

Referring now to the drawings, identified by reference numeral 11 is a portable, self-contained computational device of the present invention. The device is intended for use by athletes and other persons involved in activities which are characterized by striding, such as jogging, running, and walking. For this purpose, device 11 has a housing 12 which may be of premolded synthetic resin material such as one of the widely available thermoplastics utilized for enclosures of electronic components. Housing 12 may be preferably about the size of a hand-held calculator.

Device 11 is provided with a display 14 which may contain as many as six digits or more for display of units of distance, such as miles (or kilometers), as well as tenths and hundreths of such units, or may display time such as hours, minutes, and seconds. Display 14 may be of the conventional LCD (liquid crystal display), LED (light emitting diode), or GPD (gas plasma display) heretofore utilized in small compact electronic instruments such as hand-held calculators. If of the LCD type as presently preferred for readability, display 14 may be back-lit or otherwise illuminated by suitable light upon operation of a switch 15.

Suitably contained within housing 12 is a conventional battery, which may be of either rechargable or disposable replaceable type, adapted to power circuitry of the device and display 14, battery voltage being switched on and off by a switch 16.

Mounted within a side wall 18 of enclosure 12 is a three-digit thumbwheel switch 20 having three thumbwheels 21 for selecting three digits which appear in windows 22 for permitting preselection of the user's normal length of stride, as preferably measured in inches, or centimeters if S.I. (metric) units are to be employed. By stride is meant the distance between two successive steps of the same foot. For example, this may be approximately 100 inches or more if the user is to utilize the device during jogging. Of course, the stride is longer for running and less for walking. The user may measure his or her normal length of stride and set this figure through manipulation of thumbwheel selectors 21 or may utilize the device 11, according to a simple and effective method described hereinbelow, in a calibration mode to determine the average normal length of a stride most precisely.

Positioned on the front face 24 of the new device is a control knob 25 for setting a desired rate of traveling as in minutes per mile, or minutes per kilometers if S.I. units are preferred. Hence, the user may preselect a desired rate of travel which he or she previously may have found to be satisfactory for jogging, for example, or based upon such individual's state of physical condition or ability, or simply personal desire.

Assuming switch 16 has been turned to the "on" position, circuitry of the device, as illustrated in FIG. 5, is then operative to provide repetitive signals at a striding cue rate dependent upon the travel rate selected by control 25 and normal stride length established by selector switch 20. Located below a grill or series of apertures 26 in the top panel 27 of the device is a small loudspeaker responsive to these repetitive signals generated by the circuits within the device.

The loudspeaker accordingly provides audibly perceptible tones which are of sufficient loudness that they can be heard by the user regardless of the position of device 11 on the body of the user. These tones serve as striding or pacing cues, enabling the user to stride, as by jogging, in pace or synchronism with the tone. For example, the user may cause his right foot to hit the ground with each tone emanating from the loudspeaker grill 26. Alternatively, the user may plug an earphone into an earphone jack 29 for private listening and to prevent sound from being provided by the loudspeaker apertures 26.

It is also contemplated that a visual striding cue may additionally or alternatively be employed, as by illumination of an LED on a top panel 27, on front face 24, or on other areas of the box, including a remote illuminator plugged into the device. If the striding cue is to be of an audible nature, various transducers are suitable for this purpose, including small loudspeakers and solid state devices such as those sold under the trademark SONALERT, and others. Tactile striding cues may also be utilized, as by means of pulsing or buzzing devices.

Therefore, regardless of the form of the striding cues, whether audible (as preferred), visible or tactile, the jogger, runner, or walker may stride in synchronism with the cues and is, accordingly, paced by device 11 at a rate determined by the pace selector 20 and travel rate control 25.

It is preferred to utilize the device to provide to the athlete or other user an indication of total distance covered by the striding activity which is being paced by the device. This total distance is presented by display 14. For this purpose, the user upon commencing to stride presses a push-button switch 30 upon side wall 18, having first assured that a slide switch 32 upon front face 24 is in a normal position (marked "NORM") rather than in a calibrate position (marked "CAL"). When pushbutton switch 30 is depressed, circuitry of device 11 is responsive to the repetitive signals previously mentioned and to the stride length setting of selector switch 20, such circuitry providing periodic striding cues continuously upon each stride of the jogger, runner, etc. The circuitry also periodically provides measurements of incremental distance and also generates electronically a repetitive signal constituting incremental measurements of time. These measurements are accumulated within memory circuits of the device. If a further switch 33 is in a position shown ("DIST"), display 14 will provide a readout of the accumulated total of the distance measurements made beginning with operation of start switch 30. Therefore, there is displayed to the user an accurate indication of the total distance covered during the striding so long as such striding is in synchronism with the striding cues provided and assuming further that the correct normal stride length has been entered by the use of selector switch 20. If at any time the user wishes to stride at a different rate, it is necessary only to adjust control 25 to the desired setting and to continue striding in synchronism with the striding signals given. The new device continues to provide accurate measurement of the distance covered which is continuously displayed by display 14 regardless of the position of stride rate adjustment control 25.

If it is desired by the user of cause display 14 to indicate the total time elapsed since the initiation of operation by depressing start switch 30, it is necessary only to move switch 33 to the "TIME" position and display 14 will thereupon indicate the total elapsed time, as representatively shown in FIG. 3B.

It is also possible to configure circuitry of the device to cause display 14 to provide a readout of the length of stride which has been set into the device. If display 14 is utilized for this purpose, selector switch 20 may be replaced by a single pushbutton which, upon a first actuation, may cause the least significant digit to be incremented from zero through nine and repeating, and upon a second actuation, to cause the tens and hundreds digit to periodically increment through a range of zero through twenty, for example, and then repeating. In this way, a single button may be utilized to enter a normal length of stride in the device.

If the user wishes to terminate his striding activity, e.g., jogging, it is necessary only to press button 30, causing the device to cease providing striding cues by means 26 and also to cause the circuits of the device to cease making distance measurements but to hold the accumulated distance shown by display 14. When desired, button 30 may then again be actuated and the device will then again provide striding cues and continue to calculate actual distance measured and provide such accumulated distance readout to display 14. Alternatively, the display may provide the accumulated time, when switch 33 is moved to the "TIME" position, such time being accumulative so long as the device is able to operate by operating button 30 to again start operation. When it is no longer desired to show the accumulated distance and/or time, a reset pushbutton 34 on the face of the device may be depressed, clearing the memory circuits of the accumulated distance and time measurements.

FIG. 2 illustrates a manner of securement of the device to clothing 36 worn by a jogger 37 with the device positioned upon the shoulder of the user with display 14 in a position for being readily viewed by the user and with striding cues being audibly provided for hearing. This location permits the user to readily look at the elapsed distance or time without use of the hands or disruption of the normal athletic endeavor but also makes it possible to readily change the stride rate by manipulation of dial 25 or to vary the normal length of stride by operation of selector switch 20. It also places the start-stop pushbutton switch 30 in a location for easy manipulation.

FIG. 4 illustrates one of several ways of securing device 11 to a thickness 39 of fabric which may be constituted by an article of clothing of the user. For this purpose, cooperative hook-and-pile fabric is utilized such as that available under the trademark "VELCRO". A first layer 40 which may be of the hook-type cooperative fabric material is adhesively secured to the back face 41 of device 11. Stitched to fabric 39 is a second layer 42 of the opposite, i.e., pile-type, cooperative fabric material which is engageable by the hook-type layer 40 whereby device 11 is securely affixed to the clothing fabric layer 39 yet it is selectively removable by pulling with sufficient force. The thicknesses of the various layers 39, 40, and 42 shown in FIG. 4 are exaggerated for clarity of illustration.

Referring now to FIG. 5, a block diagram of circuitry of the device is illustrated. A master oscillator 44 is adapted to operate at a rate determined by the setting of control 25 and produces a frequency equal to 10,560 divided by the desired rate of travel, R. The output of oscillator 44 is provided to a circuit 45 which is adapted to divide the input frequency by 10X where X is the stride length determined by the setting of selector switch 20. Thus, the output of divider circuit 45 is a repetitive signal constituting a striding cue rate which is the function of both the desired rate of travel and the normal length of stride established by switch 20. It is provided to an audio output circuit 47 with which is interconnected a transducer 48 for providing audible striding cues to the user.

The output of master oscillator 44 is also provided to a divider circuit 50 for dividing the output signal of output signal of oscillator 44 by 6336. The output of circuit 50 provided through switch 32, in the normal position to a distance accumulator 51. But if switch 32 is in the calibrate position, accumulator 51 receives the output of divider circuit 45 for calibration purposes. Periodic signals provided to distance accumulator 51 represent incremental distance measurements. These incremental measurements are accumulated by distance accumulator 51 and, when switch 33 is in the position shown in FIG. 1, display 14 provides an indication of the accumulated total of said incremental measurements to the user for indication of the distance covered during jogging, running, etc.

Indicated at 53 is a clock circuit for providing periodic output pulses at a rate such as 1 hertz (but which may alternatively be in hundreths of a minute) to a time accumulator 54 whereby the pulses accumulated constitute a measurement of the time elapsed since the initiation of operation of the device. When switch 33 is moved to the "TIME" position (FIG. 1), display 14 indicates the elapsed time.

The theory of operation of the circuitry is manifested by considering that if a jogger, for example, wishes to run a mile in a given number of minutes, expressed as R minutes per mile (as determined by the setting of control 25), the new device operates to provide striding cues at a striding cue rate which may be expressed as y paces per second. The striding cue rate is a function of the jogger's normal stride length expressed as X inches per stride. Since distance covered at a constant rate of travel is equal to the rate of travel multiplied by the elapsed time of travel, then:

$$\frac{X \text{ inches}}{\text{stride}} = \frac{\text{miles}}{R \text{ min}} \times \frac{63360 \text{ inches}}{\text{mile}} \times \frac{\text{sec}}{Y \text{ stride}} \times \frac{\text{min}}{60 \text{ sec}}$$

Therefore, the frequency of striding cues must be $$Y = \frac{63360}{R \, X(60)} = \frac{10560}{10X} \frac{\text{strides}}{\text{sec}}$$

In order to provide a measurement of elapsed distance in measured increments of 0.01 miles assuming jogging at a given jogging rate of R minutes per mile, we have:

$$0.01 \text{ mile} = \frac{\text{mile}}{R \text{ min}} \times \frac{\text{min}}{60 \text{ sec}} \times X_t \text{ sec}$$

where t is the time required to travel 0.01 miles. Thus, $$t = (R)(60)(0.01 \text{ sec}) = (R)(0.6 \text{ sec})$$

so that the frequency of the 0.01 mile pulses will be $$f_{0.01 \text{ mile}} = \frac{1}{(R)(.6)} \frac{\text{pulses}}{\text{sec}}$$

Accordingly, master oscillator 44 provides a frequency of oscillation of 10,560/R where R is the setting of rate control 25 in minutes per mile. Divider 45 divides this signal by 10X whereby the signal provided to audio output circuit 47 is the rate of striding cues or pacing frequency 1056 divided by the product of R and X. But, division of 10,560 by 6336 results in a frequency equal to the reciprocal of 0.6R which is the rate of incremental measurements of 0.01 miles of distance covered by jogging at the pacing frequency, i.e., in synchronism with the cue rate. It is, therefore, to be observed that the circuitry can be converted to provide device 11 with metric measurements by changing the frequency of master oscillator circuit 44 and the divisors established by circuits 45 and 50.

To calibrate device 11 for determining a user's own normal length of stride, the following steps are taken:

a. The jogger selects a course of known length and adjusts rate control 25 marked "minutes per mile" (or minutes per kilometers if the device is a metric model) for a comfortable jogging pace.

b. The "normal/calibrate" switch 32 is placed in the calibrate position. As the jogger beings jogging over the course of known length "start/stop" pushbutton 30 is actuated. The computer then counts each audible pacing cue. If the jogger takes one stride for every audible cue, the jogging computer counts the total strides taken. At the end of the course "start/stop" pushbutton 30 is again pushed to stop operation of the circuits.

c. Stride length is then calculated by dividing the course length in inches (or centimeters for a metric model) by the number of strides indicated by display 14. For example, if a ¼ mile course is covered with 148 strides $$\text{Stride length} = \frac{\frac{1}{4} \text{ mile} \times 5280 \text{ ft/mile} \times 12 \text{ inches}}{148 \text{ strides}}$$

So, the normal length of stride is $\frac{15840}{148}$ in = 107 inches d. The stride length is then entered into the device by operation of stride length selector switch 20 to the calculated value (107 in this example).

Figure 6A:
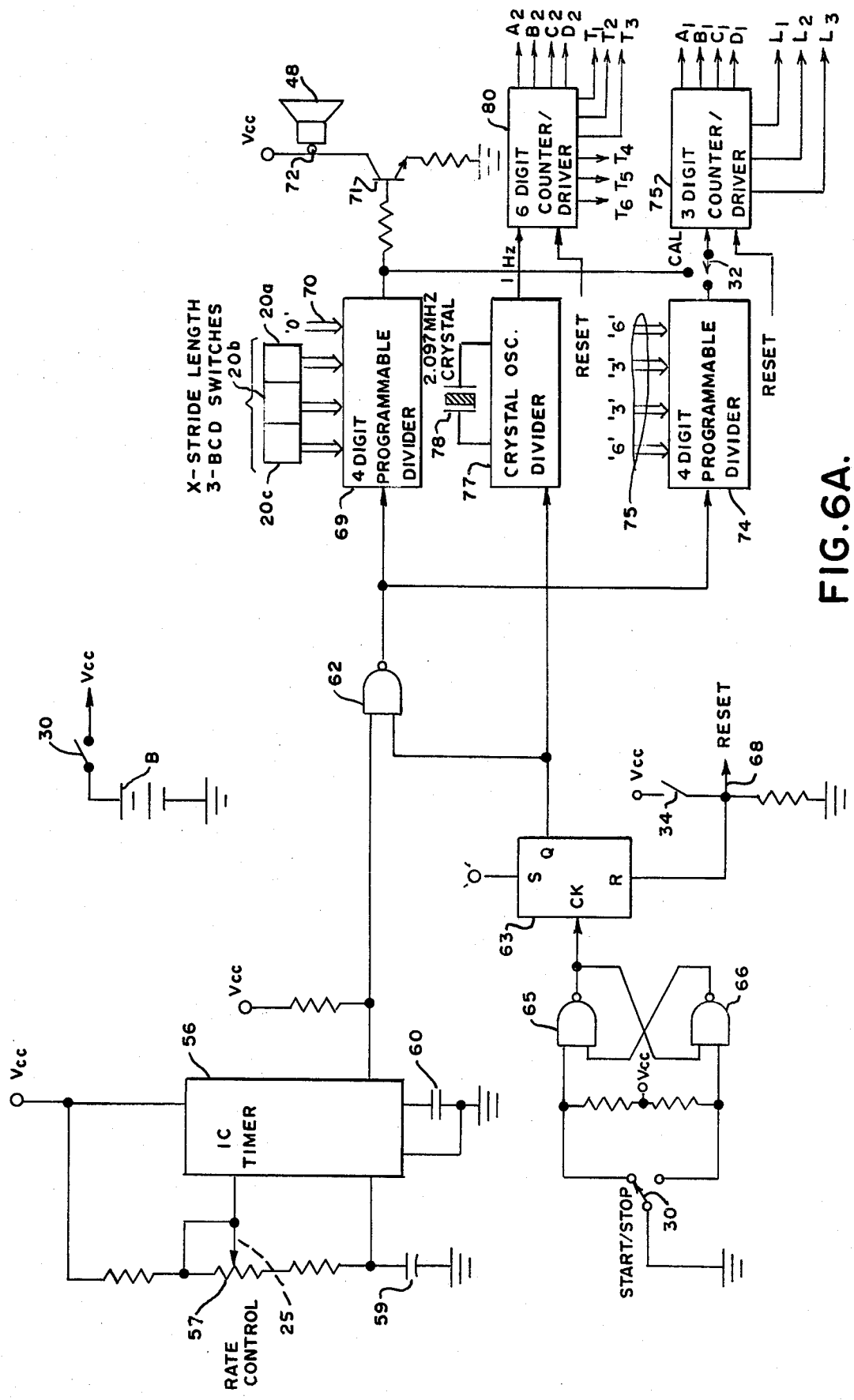
FIGS. 6A and 6B together illustrate a circuit schematic diagram of a discrete integrated circuit embodiment of the device, with the interconnection of elements of the two figures being indicated by reference characters identifying circuit leads.
Figure 6B:
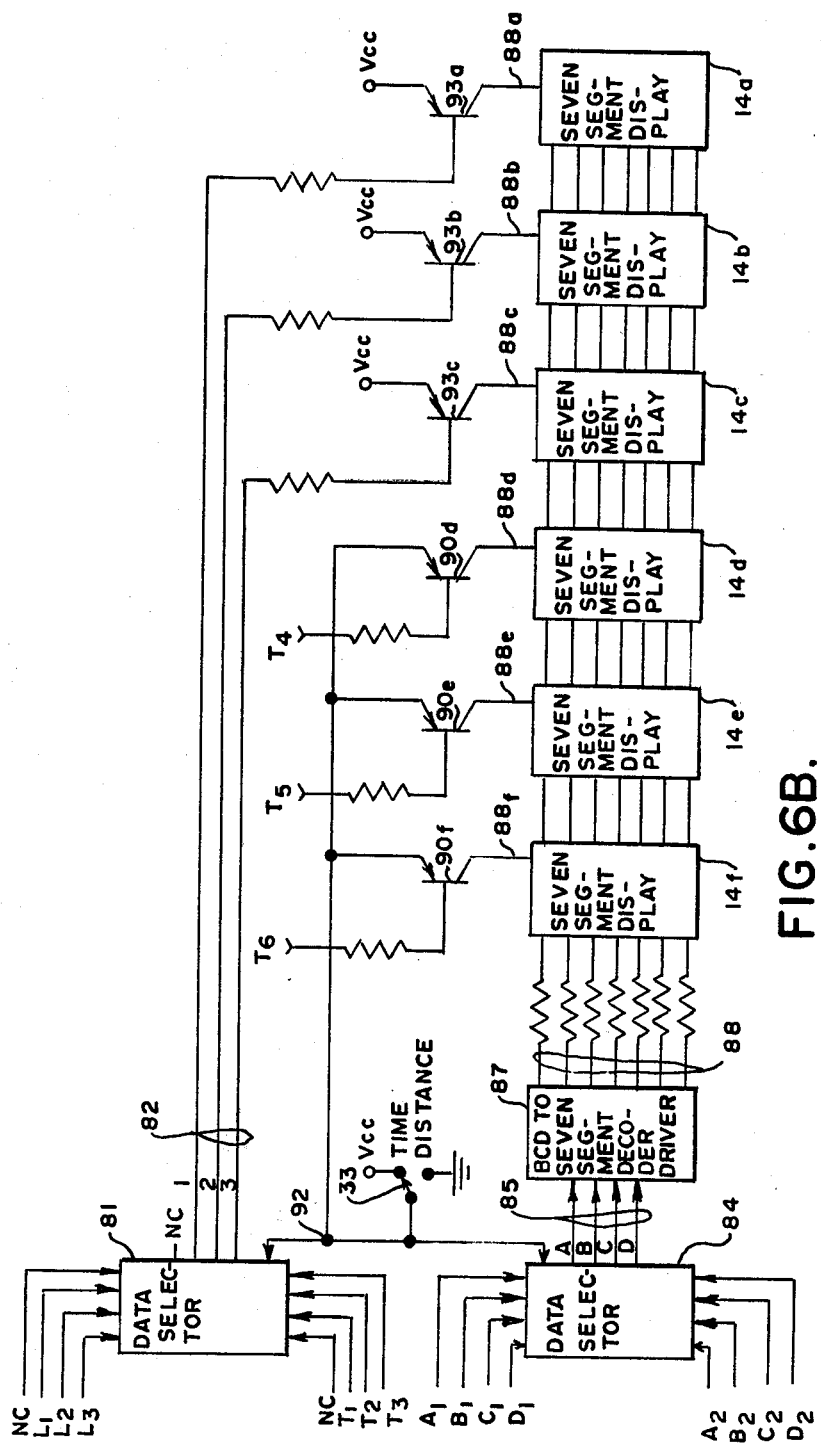

Referring now to FIGS. 6A and 6B, circuitry is illustrated of a discrete integrated circuit nature which constitutes a specific embodiment of the block diagram of FIG. 5.

Master oscillator 44 is represented in FIG. 6A by an integrated timer circuit 56 of commercially available design adapted for being provided with a voltage $V_{cc}$ and provides pulses at a rate determined by the setting of a potentiometer 57, the wiper of which is positioned by control 25. Capacitors 59 and 60 are conventionally interconnected with circuit 56 for causing proper timing operation thereof. The supply voltage $V_{cc}$ is utilized for powering other circuits of the device as well and hence the interconnection with such other circuits is not discussed in detail. Such voltage is provided by the previously described rechargeable or replaceable battery controlled by off-on switch 16 (not shown in FIGS. 6A-6B).

The output of timer 56 is provided to a NAND gate 62 for gating of the circuit provided by timer 56 in response to the level of the "Q" output of a set-reset flip-flop 63 having interconnected with its clock input a cross-connected pair of NAND gate 65,66 which are interconnected as a conditioning circuit for clocking of the flip-flop with start/stop switch 30 which is of a SPDT type. The output of flip-flop 63 is alternately rendered high or low upon successive operations of switch 30. Interconnected with the reset input of flip-flop 63 is reset switch 34, such switch being adapted to provide also by means of a circuit lead 68 a reset signal for resetting such other circuits of the device.

In this way NAND gate 62 is adapted to gate pulses from integrated circuit timer 56 to a four-digit programmable divider 69 of commercially available type having interconnected with it three binary coded decimal (BCD) type sections 20a, 20b, and 20c constituting the individual thumbwheel sections of switch 20 shown in FIG. 1. A fourth input 70 of divider circuit 69 is hard-wired to provide a zero input.

The output of divider circuit 69 is provided to the base of an NPN transistor 71 having the voice coil 72 of transducer 48 connected in the emitter-collector circuit between ground and the supply voltage $V_{cc}$.

The gated output of NAND gate 62 is also provided to a similar four-digit programmable divider circuit 74 preferably the same commercial type as circuit 69. Circuit 74 has four inputs collectively designated 75 which are hard-wired to provide the BCD inputs for the decimal number 6336 so that divider 74 will divide the signal applied to its input by this number.

Switch 32, of SPDT type, is adapted alternatively to provide the output of divider 69 or divider 74 to the input of a three-digit counter/driver circuit of BCD type designated 75. Said counter/driver circuit 75 preferably is of a type which is commercially available. Counter/driver 75 is adapted to provide multiplexed count data signifying a digital value by four data outputs designated $A_1, B_1, C_1$ and $D_1$ and with digit identification by digit select signals on outputs designated $L_1, L_2,$ and $L_3$, all such signals being provided to the circuitry of FIG. 6B. Counter/driver is reset to a zero count by a reset signal resulting from operation of switch 34.

Clock circuit 53 is also controlled by switch 30 and is a crystal oscillator divider 77 of conventional integrated circuit character having a crystal 78 connected with it and operating at 2.097 MHz whereby the output of divider 77 is a 1 Hz signal. This is provided to the input of a six-digit BCD counter/driver circuit 80 for counting in response to the output of divider circuit 77. Circuit provides multiplexed form data outputs $A_2, B_2, C_2$, and $D_2$, with indicators of six digits by means of digit select outputs $T_1$ through $T_6$.

Referring now to FIG. 6B, the digit identification outputs $L_1, L_2$, and $L_3$ of counter/driver 75 are provided to a data select-OR circuit device 81 of commercial integrated circuit type. The latter is also interconnected with counter driver 80 for receiving the latter's $T_1$, $T_2$, and $T_3$ outputs. Circuit 81 is adapted to be controlled for data select purposes by the position of time-distance switch 33, which is of an SPDT type. Hence either the digit identification outputs of circuit 80 or circuit 75 is provided by three outputs (collectively designated 82) of circuit 81 in accordance with whether switch 33 is in the "TIME" or "DISTANCE" position, respectively.

Similarly, a data select-OR circuit 84 is adapted to switch between the data outputs of counter/driver 80 or counter/driver 75 depending upon whether switch 33 is in the "TIME" or "DISTANCE" position, respectively. Therefore, circuit 84 provides data outputs A, B, C, and D via four leads collectively designated 85 to a conventional BCD-to-seven segment decoder driver 87 having seven outputs collectively designated 88 which represent the seven segment decoded output corresponding to the BCD signals provided via input leads 85 to the circuit. Signals appearing on leads 88 are provided in tandem to seven segment digit display devices (which may be of the LED or GPD type previously noted or alternatively, may through modification be constituted by digits of LCD type) and collectively designated 14A–14F.

These digital displays may be of a commercially available so-called stick of display digits and being such as to provide a multiplexed display of six digits of decimal information in accordance with the provision of the supply voltage $V_{cc}$ to common cathode electrodes 88a through 88f of the respective displays. For this purpose, PNP transistors 90d, 90e, and 90f are connected with digit displays 14d, 14e, and 14f respectively. The conductivity of these transistors is then controlled by the respective digit select outputs $T_4$, $T_5$, and $T_6$ of counter/driver 80 for causing the respective common cathode lead 88d, 88e, or 88f to be interconnected by means of a circuit connection 91 with the data select-OR circuits 81, 84. But it is apparent that the emitters of each of transistors 90d, 90e, and 90f is connected to ground when switch 33 is in the "DISTANCE" position whereby digits 14d, 14e, and 14f are blanked when switch 33 is in the "DISTANCE" position. These digits are not needed for distance indications if the new device is required only to provide a count of up to 9.99 miles. However, as will be apparent, an additional digit may be provided by utilization of display device 14d, whereby distances may be measured to 99.99 miles, etc. In a similar manner, the data select-OR outputs 82 are interconnected with respective bases of PNP transistors 93a, 93b, and 93c which respectively interconnect the common cathode lead 88a, 88b, or 88c with supply voltage $V_{cc}$.

Accordingly, there is provided a multiplexed display of six digits of information for selectively indicating either the time or distance measurements which are made by the new device, depending upon the position of switch 33.

Figure 7:
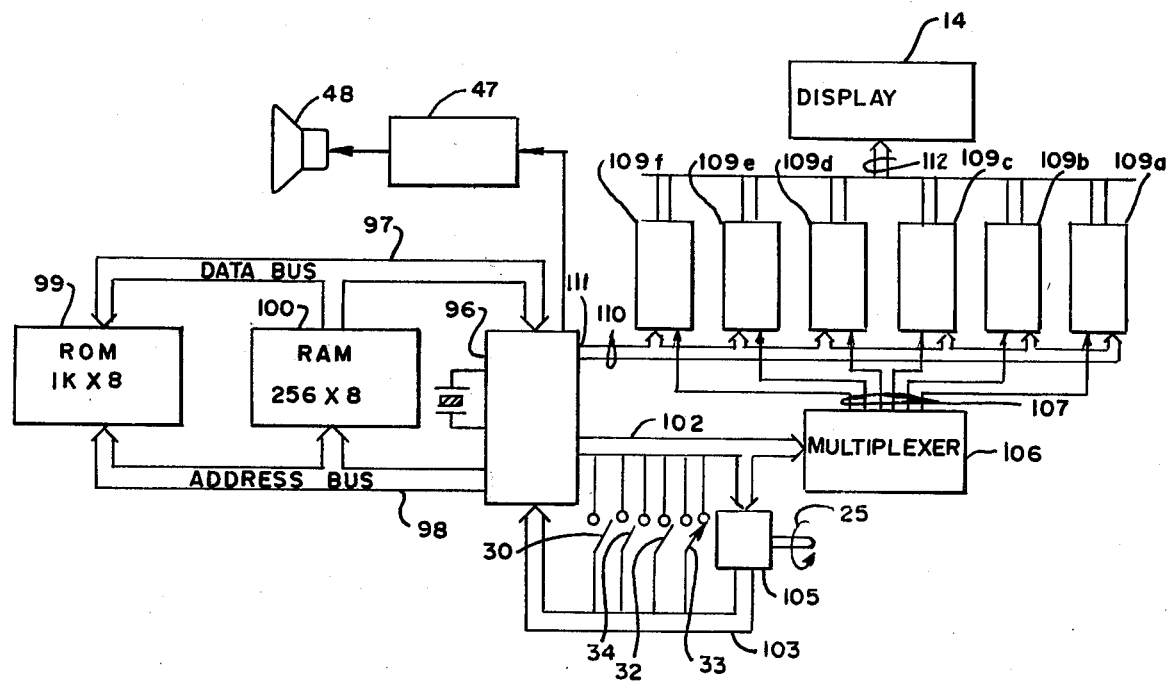
FIG. 7 is a partly blocked diagramatic, partly schematic circuit diagram of a microprocessor circuit embodiment of the device.

Referring now to FIG. 7, circuitry of the invention operating in accordance with the block diagram of FIG. 5 is based not on the use of standard integrated circuits of a discrete character but rather upon microprocessor components.

At 96 is designated a microprocessor integrated circuit character such as that now commercially available. Interconnected with microprocessor 96 by means of a data bus 97 and address bus 98 are a read-only memory (ROM) 99 and a randam-access memory (RAM) 100. Both the ROM 99 and RAM 100 may be of 8-bit type adapted for storage of one kilobyte and 256 bytes of data, respectively. Both may be of conventional integrated circuit type such as of MOSFET or CMOS design.

Further buses 102, 103 respectively interconnect microprocessor 96 with start-stop switch 30, reset switch 34, calibrate switch 32, and time-distance switch 33 for sensing the position of these switches by operation of the microcomputer. Also interconnected with data buses 102, 103 is a switch 105 adapted for being operated by control 25. Switch 105 may be of a 16-position type and yet be adequate to provide sufficient resolution of the desired minutes per mile (or minutes per kilometer) which it is desired to select by operation of control 25.

Bus 102 also interconnects the microcomputer with a multiplexer 106 of conventional integrated circuit character having a plurality of outputs collectively designated 107 which are interconnected with six BCD-to-seven segment decoder-driver latch circuits 109a–109f each adapted to receive data from microcomputer 96 via a data bus 110 connected to an output port 111 of the microcomputer. The latch circuits 109a through 109f are suitably interconnected with display 14 as indicated representatively by means of a data connection 112.

Microprocessor 96 executes a firmware program stored in ROM 99. The microprocessor program is a direct implementation of the block diagram shown in FIG. 5. Variables used by microprocessor 96 are stored in RAM 100 using the output port 111 of the microcomputer. The computed data is latched into the decoder-driver latch circuits 109a–109f by appropriate lead signals on leads 107 to provide a multiplexed display of the elapsed time or distance, dependent upon the position of switch 33, of the respective time and distance data computed by microcomputer 96.

Although the foregoing includes description and illustration of the best modes contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A portable self-contained computational device for use in pacing and measuring the extent of repetitive athletic activities, said device comprising first selector means for preselecting a distance of movement, second selector means for preselecting a user's desired speed of said athletic activities, means for providing repetitive signals at a pacing cue rate as a function of said preselected distance of movement and desired speed, means for providing perceptible pacing cues to the user in response to said repetitive signals, first accumulator means for accumulating incremental distance measurements, and display means for displaying the accumulated distance measurements to the user.

2. A portable self-contained computational device as defined in claim 1, wherein said athletic activity involves striding, said first selector means permitting preselection of the user's normal length of stride, said second selector means permitting preselection of the user's desired rate of travel by striding, said perceptible pacing cues constituting striding cues, and said display means indicates the total distance covered by striding by the user in pace with said striding cues.

3. A portable self-contained computational device as defined in claim 2 and further comprising calculating means responsive to said second selector means for periodically providing said incremental distance measurements.

4. A portable self-contained computational device as defined in claim 3, wherein said means responsive to said first selector means comprises a microcomputer, said first accumulator means comprising a random access memory, and driver means responsive to operation of said microcomputer which driver means causes said display to indicate data computed by said microcomputer.

5. A portable self-contained computational device as defined in claim 2 wherein said striding cue rate is a function of the preselected desired rate of travel and the preselected normal length of stride.

6. A portable self-contained computational device as defined in claim 1 and further comprising means for electronically calculating elapsed time and for causing said display means alternatively to display elapsed time to indicate to the user the elapsed time covered by said athletic activities.

7. A portable self-contained computational device as defined in claim 6 wherein the said time calculating means comprises a crystal, a divider circuit responsive to said crystal for providing a periodic signal constituting incremental measurements of time, second accumulator means for accumulating said incremental time measurements electronically, said display means being responsive either to said means for accumulating incremental time measurements or to said means for accumulating incremental distance measurements.

8. A portable self-contained computational device as defined in claim 7 and further comprising switching means selectively operable for causing said display means to be selectively responsive only to said first accumulator means whereby total accumulated distance can be displayed, or only to said second accumulator means whereby total accumulated time can be displayed.

9. A portable self-contained computational device as defined in claim 1 wherein said means for providing repetitive signals at a pacing cue rate comprises a timing circuit for providing a pulse-form output signal at a pulse repetition rate responsive to said rate selecting means, a first programmable divider circuit for dividing said pulse-form output signal by a predetermined variable factor, said first selector selecting means constituting a switching device for preselecting said factor.

10. A portable self-contained computational device as defined in claim 9, said means for providing perceptible pacing cues comprising a transducer and amplifier means responsive to said repetitive signals for actuation of said transducer to provide audible pacing cues.

11. A portable self-contained computational device as defined in claim 9 and further comprising a second programmable divider circuit for dividing said output signal of said timing circuit by a predetermined constant factor, means for establishing said constant factor, and switching means selectively operable for causing said first accumulator means to accumulate signals provided either by said second programmable divider circuit or said first programmable divider circuit, whereby said first accumulator means selectively accumulates either incremental distance measurements or individual pacing cues.

12. A portable self-contained computational device as defined in claim 9 and further comprising means for selectively resetting the accumulated total provided by said display means.

13. A portable self-contained computational device as defined in claim 12, said display means constituting a plurality of multiple segment display digits and means for multiplexed driving of said display digits.

14. A portable self-contained computational device as defined in claim 1 and further comprising start-stop actuation means for selectively starting and stopping the providing of said incremental distance measurements, whereby the user may selectively utilize said device intermittently without disturbing the accumulated total indication.

15. A portable self-contained computational device as defined in claim 1, said device having a compact enclosure including a power source for said device, said display being located on a face of said enclosure for being observed by the user.

16. A portable self-contained computational device as defined in claim 15 and further comprising means for detachably securing said enclosure to the body of the user.

17. A portable self-contained computational device as defined in claim 16, said means for detachably securing said enclosure comprising a layer of cooperative fabric of a first type secured to an exterior surface of said device and detachably interengageable with a second layer of cooperative fabric of an opposite type carried on the body of the user.

18. A portable self-contained computational device for use in athletic activities involving striding such as jogging, said device comprising stride length selecting means for permitting preselection of the user's normal length of stride, rate selecting means for permitting preselection of the user's desired rate of travel by striding, means for providing repetitive signals at a striding cue rate as a function of the preselected desired rate of travel and the preselected length of stride, means for providing perceptible striding cues to the user in response to said signals, means responsive to said rate select means for periodically providing incremental distance measurements, first accumulator means for accumulating said incremental distance measurements, means for electronically generating a periodic signal constituting incremental measurements of time, second accumulator means for accumulating said incremental measurements of time, and display means for selectively displaying either the accumulated total of said distance or time measurements thereby to indicate selectively to the user the total distance covered by striding and total elapsed time of said striding by the user in pace with said striding cues.

19. A portable self-contained computational device as defined in claim 18 wherein said rate selecting means is calibrated for enabling the user to preselect the desired rate of travel expressed directly in minutes per conventional unit of distance measurement such as miles or kilometers.

20. A portable self-contained computational device as defined in claim 18 and further comprising means selectively operable for causing said first accumulator means to accumulate the total number of strides to be taken by striding in pace with said striding cue rate during an interval of operation of said device.

* * * * *